(12) United States Patent
Sinko et al.

(10) Patent No.: US 6,203,388 B1
(45) Date of Patent: Mar. 20, 2001

(54) INTEGRATED EXTERNAL ELECTRIC DRIVE PROPULSION MODULE ARRANGEMENT FOR SURFACE SHIPS

(75) Inventors: Michael S. Sinko, Preston; James S. Smith, Old Lyme; Pieter Van Dine, Mystic; John H. Chapman, Groton, all of CT (US)

(73) Assignee: Electric Boat Corporation, Groton, CT (US)

( * ) Notice: Subject to any disclaimer, the term of this patent is extended or adjusted under 35 U.S.C. 154(b) by 0 days.

(21) Appl. No.: 09/236,185

(22) Filed: Jan. 25, 1999

(51) Int. Cl.$^7$ ...................................................... B60L 11/02
(52) U.S. Cl. ................................................ 440/6; 114/337
(58) Field of Search ..................................... 440/6, 38, 46, 440/47, 48, 49, 51, 53, 54, 66–69, 79, 80, 83, 337, 338

(56) References Cited

U.S. PATENT DOCUMENTS

| | | |
|---|---|---|
| 120,264 | 10/1871 | Godfrey et al. . |
| 340,237 | 4/1886 | Nagel et al. . |
| 2,483,675 | * 10/1949 | Sheldon ................................. 114/166 |
| 2,692,570 | * 10/1954 | Costa ................................... 114/77 A |
| 3,002,486 | * 10/1961 | Jardmo .................................... 440/38 |
| 3,155,065 | 11/1964 | Strumskis . |
| 3,182,623 | * 5/1965 | Lehmann .............................. 114/338 |
| 3,601,989 | 8/1971 | Austin . |
| 3,939,794 | * 2/1976 | Hull ........................................ 440/38 |
| 4,863,404 | 9/1989 | Salo . |
| 5,181,868 | * 1/1993 | Gabriel ................................... 440/67 |
| 5,203,728 | 4/1993 | Kobayashi . |
| 5,435,761 | 7/1995 | Shimamune et al. . |
| 5,462,460 | 10/1995 | Kobayashi . |
| 5,490,768 | 2/1996 | Veronesi et al. . |

* cited by examiner

*Primary Examiner*—Ed Swinehart
(74) *Attorney, Agent, or Firm*—Baker Botts L.L.P.

(57) ABSTRACT

In the external electric drive propulsion module arrangement described in the specification, two parallel propulsion units are mounted in a housing affixed beneath the stern of a ship and having a surface contour conforming to the contour of the adjacent surface portions of the ship's hull. Each propulsion unit is disposed substantially horizontally to provide maximum propulsion efficiency and has a rotating blade section for driving water rearwardly from an inlet and a fixed blade section following the rotating blade section. The inlet receives water from a wraparound array of screened intake openings near the forward end of the module housing which draws in the surface boundary layer of the ship's hull. In addition, vertical vanes are affixed to the stern of the ship to straighten the flow of water from the propulsion units.

6 Claims, 3 Drawing Sheets

INTEGRATED EXTERNAL ELECTRIC DRIVE PROPULSION MODULE ARRANGEMENT FOR SURFACE SHIPS

BACKGROUND OF THE INVENTION

This invention relates to propulsion arrangements for surface ships.

Conventional propulsion arrangements for surface ships are generally internally powered, shaft driven propeller type systems in which a drive shaft extends through the ship's hull from an internal power source to a propeller at the rear of the vessel. In order to accommodate a large diameter propeller which must be spaced from the keel of the ship and to facilitate the layout of the ship's propulsion plan equipment in the typical hull geometry, the drive propeller normally passes through the ship's hull at a downward angle so that the propeller is inclined from a vertical plane. This angled shaft arrangement reduces propeller efficiency and often causes a propeller to protrude far beyond the keel of the ship, making it susceptible to blade hits. Maintenance required by bent or broken propeller blading or shafting requires dry dock work and is expensive. In addition, severe blade impacts can also cause shaft and drive train damage, requiring hull cuts or extensive engine room disassembly for repair and may even result in flooding or lack of propulsion or maneuverability of the vessel which could result in loss of the vessel at sea. Strut-mounted pods containing individual externally driven propulsion units and pump jets have been provided to address some of the above shortcomings. Those arrangements, however, do not address all of the shortcomings of conventional propulsion arrangements nor do they offer any potential for improving overall efficiency and reducing wakes in inland or near shore waterways.

The patent to Strumskis No. 3,155,065 discloses an arrangement for propelling a ship by internally contained electric motors installed in ducts which extend through the ship's hull. Water is guided through the duct from inlets at the bow and along the sides of the ship and is driven out openings in the stern of the ship by propellers mounted within the ducts. The patent to Salo No. 4,863,404 shows a jet propulsion system for surface ships which has intake ports at the bow to receive water and outlet ports along the side and bottom and internally mounted impellers provide the motor force to the stream of water passing through internal ducts in the ship.

The Kobayashi Patent No. 5,203,728 shows a water jet propulsion unit for a water craft in which a pair of jet units is mounted at the stern of the craft in a specially formed tunnel which keeps the units separate from the overall boat structure to facilitate removal for service and repair. The hull also has access openings adjacent to jet propulsion units to permit serving without removal of the units. The impellers in the jet propulsion units are driven by shafts extending through a vertically extending wall at the forward end of the tunnel from an engine mounted within the hull of the craft. The Kobayashi Patent No. 5,462,560 and the Veronesi et al. Patent No. 5,490,768 disclose water jet propulsion units which are mounted in a hull structure so as to draw water through the hull for jet propulsion of the vessel.

SUMMARY OF THE INVENTION

Accordingly, it is an object of the present invention to provide an integrated external propulsion module arrangement for surface ships which overcomes disadvantages of the prior art.

Another object of the present invention is to provide an integrated external electric drive propulsion module arrangement which captures a ship's hull boundary layer so as to improve the efficiency and a propulsion unit which is capable of being removed and replaced from the ship's hull without requiring hull cuts or disassembly These and other objects of the invention are attained by providing a drive module housing which is shaped to be mounted in a recess in the stem portion of a ship's hull and has a surface configuration conforming to the configuration of the adjacent portions of the ship's hull. The housing has an inlet duct adjacent to the forward end of the module providing a water intake with a substantially uniform velocity profile and at least one propulsion unit is horizontally disposed in the module for driving water received through the inlet toward an outlet at the rear of the module, the propulsion unit including an electric drive motor powered through electrical power connections in the hull of the ship. Preferably the electric motor is a rim drive motor for rotating a blade arrangement to propel water from the inlet to the outlet and the module includes stationary blades to straighten the outlet flow path and reduce losses resulting from tangential flows produced by the rotating blades. The module, in addition to having propulsion units which are separately removable from the module thus facilitating repair and replacement, may also be completely removable from the stern of the ship.

BRIEF DESCRIPTION OF THE DRAWINGS

Further objects and advantages of the invention will be apparent from the reading of the following description in conjunction with the accompanying drawings, in which.

DESCRIPTION OF PREFERRED EMBODIMENTS

Figure 1:
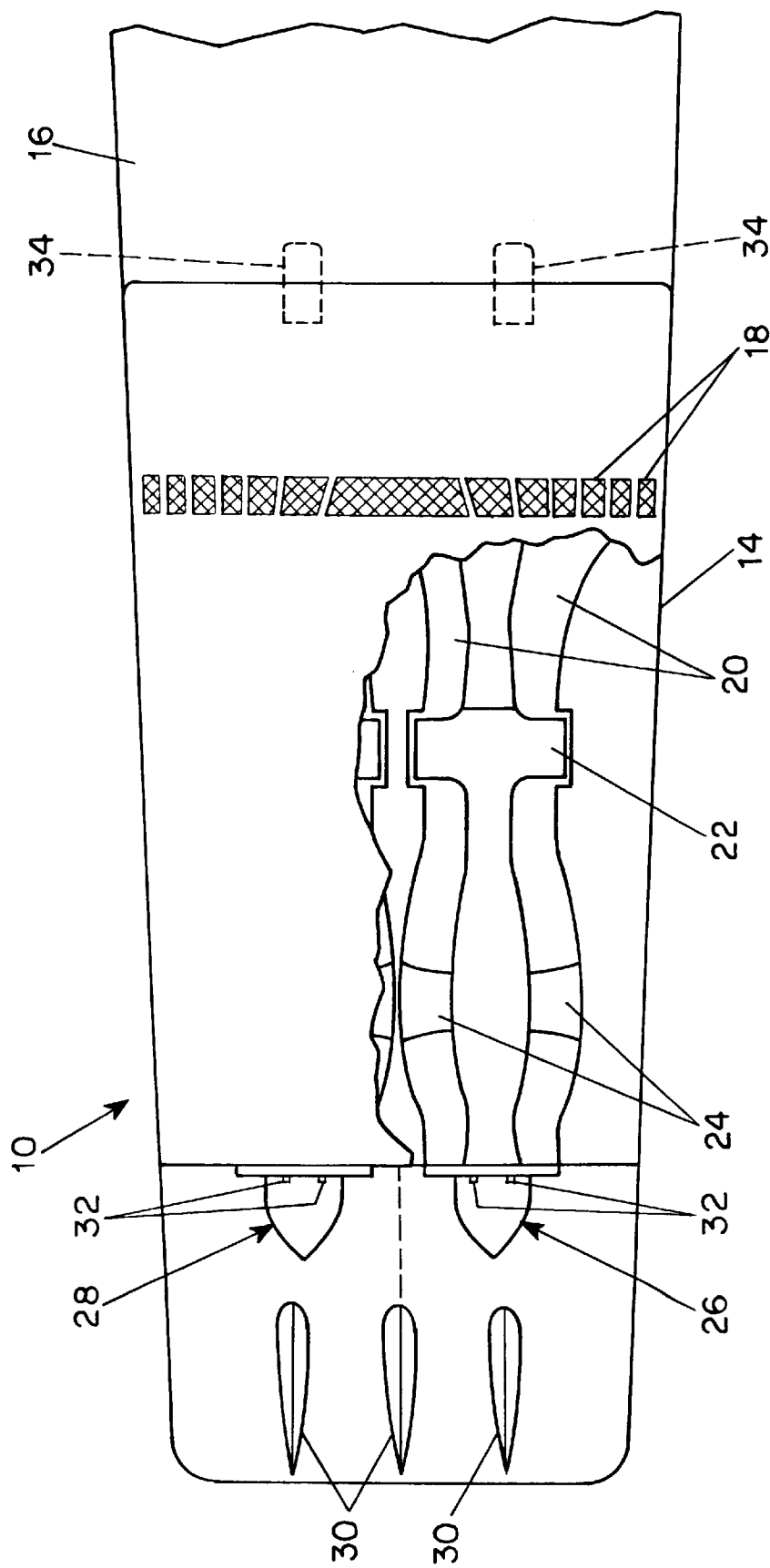
FIG. 1 is a bottom view of the stern portion of a ship having an integrated external electric propulsion module arrangement in accordance with the invention.
Figure 2:
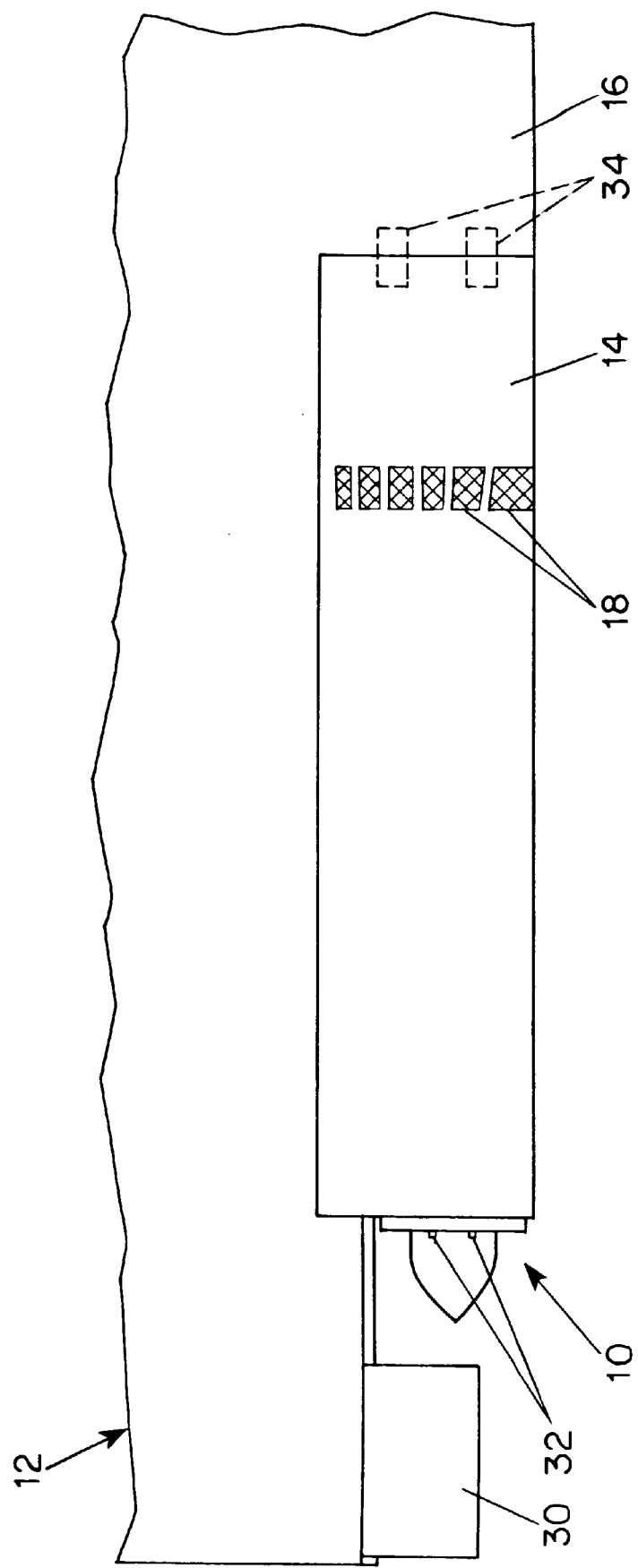
FIG. 2 is a side view of the stern portion of the ship shown in FIG. 1.
Figure 3:
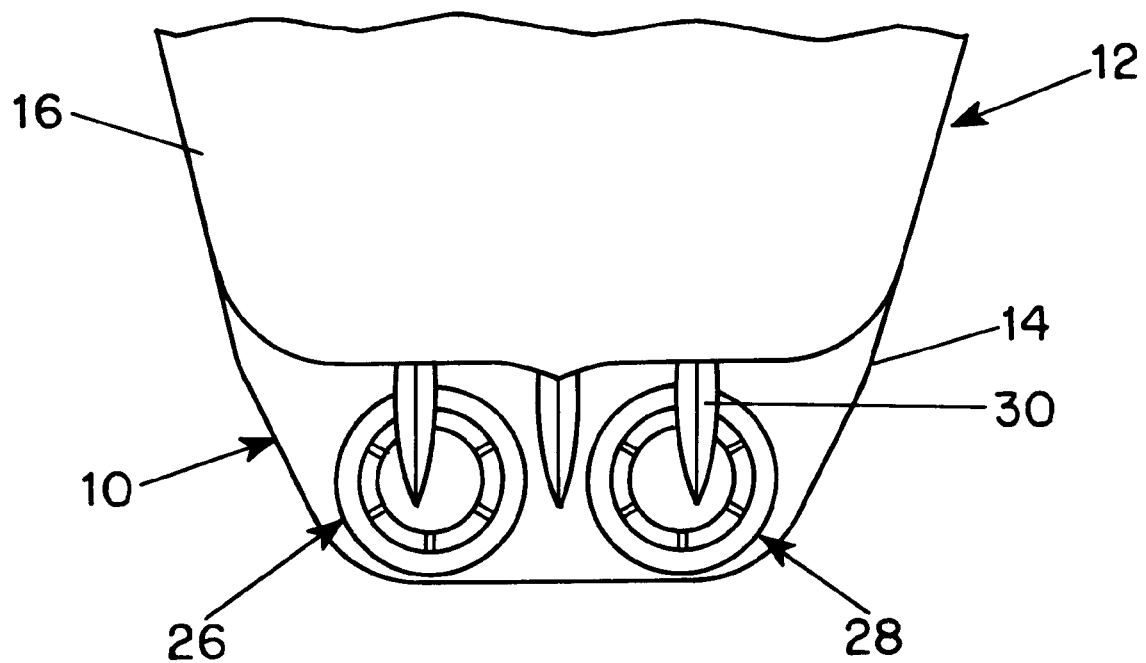
FIG. 3 is an aft view of the ship of FIGS. 1 and 2.

In the typical embodiment of the invention shown in the drawings, an integral external electric drive propulsion module arrangement 10 is mounted at the bottom of the stern portion of a ship 12 and has a metallic or nonmetallic housing 14 which is shaped to conform structurally and hydrodynamically with the shape of the ship's stern hull 16 so as to provide continuous contours, facilitating the flow of the surface boundary layer. Near the forward end of the module 10, the housing 14 has a continuous wraparound array of screened intake openings 18 extending around the periphery of the housing to convey water from the surface of the hull into a plurality of internal ducts 20 which lead to successive rotating and stationery blade sections 22 and 24, respectively, of two propulsion units 26 and 28. The rotating blade sections 22 are preferably powered by rim drive electric motors of the type disclosed for example in the Eaves et al. Pat. No. 5,967,749 the disclosure of which is incorporated herein by reference. Electrical power for driving the electric motors is preferably supplied to the module 10 from an electrical power source mounted within the ship through electrical connectors in the ship's hull communicating with the module. The propulsion units 26 and 28 have stationary blades 24 to straighten the water flow so as to eliminate losses which could result from tangential flows developed by the rotating blades 22 of the propulsion units and thereby maximize forward thrust. The outflow path from the propulsion units 26 and 28 has a plurality of vertical vanes 30 projecting downwardly from the hull of the ship to divert the water flow from the propulsion units thus aiding the ship's maneuverability.

The intake openings 18 at the forward end of the module 10 are screened by appropriately spaced bars to prevent ingestion of large objects and are designed to introduce a uniform velocity profile to the maximum possible extent to the bladed sections 22 and 24 of the ducts 20, while drawing in the boundary layer flow formed along the ship's hull 16. The boundary layer intake arrangement of the inlet 18 is preferably of the type described in the copending Chapman Patent No. 6,082,670, the disclosure of which is incorporated herein by reference. The hull 16, including the shape of the ship's bow and the intake openings 18 are designed to minimize the energy lost in the wave and wake-making actions typical for surface ships and the maximum forward thrust from the fluid is obtained by providing the stationary blades 24 to straighten the flow path following the rotating blades 22 in each propulsion unit.

In addition, the module 10 may be provided with structures to facilitate and maximize maneuverability of the ship such as thrust vectoring nozzles and flow reversing clamshells or other conventional devices to reduce stopping distances if desired. Any such maneuvering structure is faired into the ship's hull to minimize flow separation. Each of the propulsion units 26 and 28 is separately removable from the module 10, for example by removal of schematically represented mounting members 32, either through the end of the module or by providing access panels in the bottom or side of the module and, if desired, the module 10 itself may also be separable from the ship's hull, for example by removal of schematically represented mounting members 34 as represented by the separation line 34 in the drawings.

With the external electric drive propulsion module arrangement of the invention, the wrap-around design of the inlet at the forward end of the module housing captures the uniform boundary layer of the ship's hull to the maximum extent possible and, since the propulsion module is completely external to the ship's hull, there is no need for any shaft to pass through the hull, thereby avoiding survivability issues associated with a failed or bent shaft or failed shaft seals. Moreover, the blade sections of the propulsion modules are completely enclosed, permitting shallow draft operation without risk of any damage to the blades. In addition, the screened inlet openings prevent introduction of large submerged objects into the propulsion units so as to prevent damage to the propulsion blades. The ability to remove each individual propulsion unit, which can be accomplished without dry docking, facilities rapid repair when necessary.

Although the invention has been described herein with reference to specific embodiments, many modifications and variations therein will readily occur to those skilled in the art. Accordingly, all such variations and modifications are included within the intended scope of the invention.

We claim:

1. An external propulsion module arrangement for a surface ship comprising:

a housing adapted to be mounted beneath the stern of a ship having a forward end adapted to abut the stern of a ship and an outer surface contour at the forward end conforming to the adjacent contour of the stem of the ship;

at least one propulsion unit removably mounted in the housing having an intake duct, a rotating blade section following the intake duct, and a stationary blade section following the rotating blade section;

an array of intake openings extending around the outer surface of the housing and connected to the intake duct and arranged to draw the ship's hull boundary layer into the intake duct; and electric drive means for driving the rotating blade section about a substantially horizontal axis to propel water from the inlet rearwardly through an outlet in a horizontal direction to propel the ship forwardly.

2. An external propulsion module arrangement according to claim 1 including a plurality of vertical vanes arranged to extend downwardly from the ship's hull and rearwards of the propulsion unit for diverting the rearward flow of water from the propulsion unit.

3. An external propulsion module arrangement according to claim 1 wherein the housing contains at least two propulsion units.

4. An external propulsion module arrangement according to claim 1 wherein the electric drive means is a rim drive electric motor for driving the rotating blade section.

5. An external propulsion module arrangement according to claim 1 wherein the intake openings are screened to prevent ingestion of foreign material into the propulsion unit.

6. An external propulsion module arrangement according to claim 1 wherein the module is separable from the ship's hull.

* * * * *